US010383311B1

(12) United States Patent
Kane (10) Patent No.: US 10,383,311 B1
(45) Date of Patent: Aug. 20, 2019

(54) HEATED ANIMAL WATERING RESERVOIR

(71) Applicant: Bryan Kane, Longmont, CO (US)

(72) Inventor: Bryan Kane, Longmont, CO (US)

( * ) Notice: Subject to any disclaimer, the term of this patent is extended or adjusted under 35 U.S.C. 154(b) by 12 days.

(21) Appl. No.: 16/001,252

(22) Filed: Jun. 6, 2018

(51) Int. Cl.
  *A01K 7/04* (2006.01)
  *A01K 7/02* (2006.01)
  *A01K 39/026* (2006.01)
  *A01K 39/024* (2006.01)

(52) U.S. Cl.
  CPC .............. *A01K 7/027* (2013.01); *A01K 7/025* (2013.01); *A01K 39/024* (2013.01); *A01K 39/026* (2013.01)

(58) Field of Classification Search
  CPC ...... A01K 27/00; A01K 27/027; A01K 27/04; A01K 39/02; A01K 39/04; A01K 7/00; A01K 7/027; A01K 7/04
  USPC .................................. 119/72, 73, 74, 78–80
  See application file for complete search history.

(56) References Cited

U.S. PATENT DOCUMENTS

| | | |
|---|---|---|
| 317,439 A | 5/1885 | Burrell |
| 723,651 A | 11/1902 | Cogswell |
| 1,121,528 A | 5/1911 | Mueller |
| 1,042,040 A | 11/1911 | Schreck |
| 1,082,535 A | 6/1914 | Guthrie |
| 1,269,874 A | 11/1915 | Soucy |
| 1,220,404 A | 11/1916 | Eaton |
| 1,341,919 A | 1/1919 | McCartney |
| 1,458,450 A | 1/1920 | Under et al. |
| 1,922,512 A | 1/1922 | Barker |
| 1,438,770 A | 6/1922 | Long |
| 1,824,154 A | 3/1930 | Johnson et al. |
| 2,584,383 A | 4/1947 | Feck |
| 2,573,802 A | 3/1950 | Mitchell |
| 2,665,366 A | 3/1951 | Cleveland |
| 2,762,332 A * | 9/1956 | Laster, Sr. ............. B05B 1/3426 119/78 |
| 2,904,004 A | 9/1957 | Bruns et al. |
| 3,691,997 A * | 9/1972 | Hatch ....................... A01K 7/02 119/51.11 |
| 3,823,692 A * | 7/1974 | Bowser .................... A01K 7/02 119/78 |

(Continued)

FOREIGN PATENT DOCUMENTS

GB            2239383 A   *   7/1991   ............... A01K 7/04

OTHER PUBLICATIONS

Miller MFG. Little Giant™ Item No. 166386.

*Primary Examiner* — David J Parsley
*Assistant Examiner* — Danielle A Clerkley
(74) *Attorney, Agent, or Firm* — Patent Law Offices of Rick Martin, P.C.

(57) ABSTRACT

An animal watering system can be used to water poultry for extended periods of time without operator attention. An upper reservoir is electrically heated with a waterproof resistance heater. A lid allows filling from the top. A four legged (metal) stand supports the reservoir above the ground. A plumbing tree connects at the bottom and has a shut off valve, an easy to clean filter and a float switch valve which keeps the water level constant in a trough located under the stand. The trough is preferably supported above ground by a (circular) base which can have its own electric heater. The float switch prevents any trough water from flowing upward into the reservoir. The plumbing tree has a hose inlet used for filling or cleaning.

20 Claims, 6 Drawing Sheets

(56) References Cited

U.S. PATENT DOCUMENTS

| | | | | |
|---|---|---|---|---|
| 4,110,603 | A | * | 8/1978 | Peterson .................. E03B 7/14 |
| | | | | 219/535 |
| 4,440,112 | A | * | 4/1984 | Lilyerd .................. A01K 7/04 |
| | | | | 119/73 |
| 4,883,022 | A | * | 11/1989 | Barker .................. A01K 7/027 |
| | | | | 119/73 |
| 1,460,702 | A | | 2/1992 | Caltrider et al. |
| 5,174,245 | A | * | 12/1992 | Bishop .................. A01K 7/00 |
| | | | | 119/73 |
| 7,735,455 | B2 | | 6/2010 | Clark, Jr. |
| 8,826,859 | B1 | | 9/2014 | Slinkard |

\* cited by examiner

HEATED ANIMAL WATERING RESERVOIR

FIELD OF THE INVENTION

The present invention relates to providing a clean and non-frozen water supply to animals such as chickens on a year round basis.

BACKGROUND

Maintaining a reliable clean available source of drinking water is crucial for the survival of animals. This is difficult in remote locations without a natural water supply and especially during winter months where there is a potential for source water to freeze solid.

Typically, domestic animals, whether pets or livestock, are left unattended for extended periods of time during the day or even over the course of several days. In order to meet the feeding needs of the animals, a common practice is to minimally leave a supply of water in a location accessible to animals allowing them to drink at will from the supply.

In order to provide animals with needed water during winter months, it is known to equip exterior watering systems with heating systems to prevent the contained water therein from icing over during cold temperatures. In some waterers, heating systems may be in the form of oil lamps. In more modern waterers, electric heating systems may be affixed to the fresh water delivery element, drinking receptacle, or integrated by other means. In the even of heating system failure, replacement can be difficult due to freezing and possibly require total replacement of the waterer due to an integrated heating design. Nipple style waterers are difficult to keep from freezing when the nipples are remote from the heat source. Geothermal designs tend to be a more permanent installation frequently requiring a plumbed water supply.

Failure of the heating system typically results in an iced or frozen waterer in below freezing environments. Restoring a failed system to properly flow water after repairs can be a difficult, or impossible as in the case of cracked or broken fresh water storage devices or drinking receptacles. The repair process may require much time, may require relocating the system to an above freezing environment, and may be too heavy to relocate easily for repair. The opportunity for discomfort for the operator (spilled water for example) or potential injury (heavy lifting of a filled or frozen water system) make an alternate design more desirable. A failed water system may result in animals that may become diseased, dying, or dead.

Many systems may be materially inferior due to breakage if they become brittle as a result of prolonged UV light exposure, or prolonged freeze/thaw cycles. Waterer materials selected, water source, and environment can influence corrosion, mineral deposits, and contaminants providing a means to restrict or inhibit water flow through the level metering device and other service elements. Service procedures and access of the elements may be difficult often requiring draining of the system, disassembly, and servicing from within the water reservoir. Often this requires the waterer be inverted and/or drained for service, resulting in spilled or wasted water, potentially risking injury to the operator. Many waterers don't provide a means for draining. Potential failure components of such systems may be difficult to service, and often systems may be immobile due to design or physical size and weight. Many use heating systems utilizing electric heating elements attached to framing or similar structural components that are not temperature regulated resulting in inefficient operation and may expose animals to a threat of electrocution or shock in the even of failure. Normal waterer use may cause contaminants (calcium) to build in the drinking receptacles which may be difficult to clean and service. Contaminants may be in the form of living organisms such as algae, bacteria, or other biologicals that can pollute the drinking water, and potentially the fresh water source as the drinking water may maintain contact with the supply water.

Other waterers may not fully guard the water metering system from animals, may not protect the waterer from damage during use, may rely on restrictive openings limiting animal varieties that can use the waterer, may rely on a pump supplied water source from underground or an exposed hose that can be damaged by animals, may rely on recirculating systems, or other mechanisms such as a vacuum break feature requiring a high degree of maintenance or which may be prone to failure, especially in harsh environments. Many waterers use construction elements not suitable for human potable water standards. There are growing contamination concerns that chemicals within materials selected leach into drinking water allowing unwanted chemicals to remain with the animals serviced by the waterer.

U.S. Pat. No. 7,735,455 B2 (Jun. 15, 2010 to Benjamin T. Clark, Jr.)—Farm Innovators Electric Heated Poultry Font—Plastic—Limited to 0° F. temperature. Drinking water remains in contact with supply water. Must tip over to fill. Cleaning requires getting wet or must tip over. Sits on the ground. Chickens or fowl only. No drain, filter, or shut off. Drinking Receptacle limits animal use.

U.S. Pat. No. 8,826,859 B1 (Sep. 9, 2014 to Harris Farms LLC) Animal Drinker bucket. Made of plastic makes it easily broken. Made for chickens or fowl only. Drinking water remains in contact with supply water. It is not heated. Fill from open top. No drain, filter, or shut off. Drinking receptacle limits animal use.

U.S. Pat. No. 723,651 (Nov. 18, 1902 to S. E. Cogswell) Not heated—basic vacuum break/gravity feed. No filtering or float control. Must tip over to fill. Drinking water remains in contact with supply water. No drain, filter, or shut off. Drinking receptacle limits animal use to small bowl.

U.S. Pat. No. 1,042,040 (Nov. 18, 1911 To A. Schreck) Vacuum Break/Gravity design—Must tip over to fill. Labor required to re-assemble. Not Heated. Drinking water remains in contact with supply water. Chickens only. No drain, filter, or shut off. Drinking Receptacle limits animal use.

U.S. Pat. No. 1,082,535 (Jun. 6, 1914 to W. H. Guthrie) uses lamp oil heat. Has heat conduit surrounding discharge pipe. Fasteners to be removed to access heat source. Vacuum break design. Restrictive animal drinking receptacles. No drain, filter, or shut off. Fill from top. Drinking water remains in contact with supply water. Drinking receptacle limits animal use.

U.S. Pat. No. 1,121,528 (May 28, 1911 to C. W. Mueller) Not heated—rods connected permanently to water trough. Harder to maintain. For poultry only. Tie rings and threaded design for suspension use in train cars etc. No drain, filter, or shut off. Must tip over to fill. Drinking water remains in contact with supply water. Drinking receptacle limits animal use.

U.S. Pat. No. 1,220,404 (Nov. 22, 1916 to A. N. Eaton) Drinking water remains in contact with supply water. Has shut off valve. Lamp oil heated. No drain. Fill from Top. Drinking Receptacle limits animal use. The design focus is on stock, not poultry.

U.S. Pat. No. 1,341,919 (Jan. 24, 1919 L. C. McCartney) Drinking water remains in contact with supply water. Has suspended water tank and shut off valve. Lamp oil heated with no drain. Fill from top. Drinking receptacle limits animal use.

U.S. Pat. No. 1,438,770 (Jun. 5, 1922 to C. Long) uses float valve and strainer—lamp oil heated—difficult to service. Requires disassembly. Must reach into water chamber to service strainer. Drinking receptacle limits animal use. Fill from top. No Drain. Designed for livestock focus.

U.S. Pat. No. 1,460,702 (Feb. 28, 1922 to S. P. Caltrider et. al.) Vacuum Break design, Leave in place or portable to fill—top component removes for filling—openings limit animal use—not heated. Drinking water remains in contact with supply water. Drinking Receptacle limits animal use. Poultry only. Water sits on ground level.

U.S. Pat. No. 1,824,154 (Mar. 7, 1930 to C. Johnson et. al.) Spring vacuum break. Typical of Little Giant™ double wall fonts of various fluid capacities. Drinking water remains in contact with supply water. Drinking Receptacle limits animal use. Poultry only. No heat.

U.S. Pat. No. 2,665,366 (Mar. 20, 1951 to W. F. Cleveland) Electrically heated with float assembly—no filter, water supply through hose or underground supply. Thermostatically controlled. Heating element integral to design—difficult to service. Heater immersed in reservoir and wrapped around feed line. Reservoir difficult to clean—requires disassembly. Corrosion of slide lid makes it difficult to operate over time. Animals can walk on and damage reservoir rendering sliding lid inoperable. Drinking water isolated from supply water. Supply water from underground source. Drinking water receptacle rests at ground level.

U.S. Pat. No. 2,904,004 (Sep. 4, 1957 to C. H. Bruns et. al.) This reference is perhaps the closest known prior art. It is a livestock waterer with a float operated running double acting valve and seat assembly (two areas to fail). It has a strainer and fill from top. Not serviceable if frozen. Hard to service if parts fail. Hard to service strainer if clogged. Must drain water, but this requires tipping unit over if clogged. Openings limit animal use. Resting on ground can cause corrosion losing integrity of water holding chamber. Heater not temperature controlled. Wear items difficult to replace or source. Springs support heating element which are a failure and maintenance issue. Supply water somewhat isolated from drinking water. Not a submersible heater—potential for failure not safe for animals—electric shock. Heating element is between water source and drinking water. Has headers or openings for animals to drink. Requires draining tank (no means provided) in order to change heating element. Tank otherwise must be moved when full to replace heater. Fill from top.

U.S. Pat. No. 1,269,874 (Nov. 2, 1915 to E. O. Soucy) is lamp oil heated. Drinking water is isolated from supply water. It has drain, but difficult to service. It has a float but no strainer or shut off. Fill from top.

U.S. Pat. No. 1,458,450 (Jan. 20, 1920 to J. W. Under et al) is oil lamp heated tank with small cap and isolation rod for filling. Drinking water remains in contact with supply water. Fill from top. Poultry only are watered.

U.S. Pat. No. 1,922,612 (Jan. 7, 1922 to H. J. Barker) is similar to a Mason Jar Font with very small volume. Drinking water remains in contact with supply water. Tip over to fill. Poultry only are watered.

U.S. Pat. No. 2,573,802 (Mar. 17, 1950 to W. D. Mitchell) has a Mason Jar Font. Drinking water remains in contact with supply water. Tip over to fill.

U.S. Pat. No. 2,584,383 (Apr. 15, 1947 to J. F. Feck) Little Giant™ vacuum break implemented with a hole. Drinking water remains in contact with supply water. Poultry only. Tip over to fill.

U.S. Pat. No. 317,439 (Aug. 9, 1963 to H. Juenger) Electric heated Mason Jar Bird waterer. Drinking water remains in contact with supply water. Disassembly to fill. Tip over to fill.

Other commercially available designs include Little Giant™ Miller Manufacturing Automatic Poultry Waterer Item 166386 with a hose feeding a float valve assembly.

What is needed in the art is a reservoir protected from the watering trough. The reservoir, the plumbing and the trough must be freeze proof. An easily maintained filter is needed. A hose feed is needed. A hose cleaning mode is needed. Easy maintenance and drainage is needed. The present invention meets all these needs.

SUMMARY OF THE INVENTION

The main object of this invention is to provide a modular waterer which is easy to clean, maintain, and repair as required with minimal discomfort to the operator and serviced animals.

Another object is to provide a modular waterer allowing the porting mechanism between the fresh water supply and the drinking receptacle to adapt to new and future requirements, and to allow the waterer to adapt to many climates without unnecessary expense of a heating system if installed in above freezing environments.

Another object is to provide an animal waterer that may be used without attention over prolonged periods, and with assurance it will provide animal water during low temperature conditions if desired.

Yet another object is to provide a waterer which maintains the liquid level constant, provides a method to isolate the fresh water supply from the drinking water supply in order to prevent cross contamination, more effectively prevents contamination from entering the critical operating parts of the system, provides a method to filter or strain the fresh water supply, provides a method to drain the waterer, provides a method to use the fresh water supply to clean the drinking receptacle, and is developed on a mobile platform.

Yet another object is to provide an improved means for preventing animals from access to critical and heretofore normally exposed parts of the system so as to more adequately protect such parts from damage by the animals and preclude fouling thereof as a result of such exposure.

Another object is to provide a drinking receptacle that is elevated from ground level making it more ergonomic from which animals may drink while reducing the potential of ground born scratch contaminants entering the drinking receptacle from animal activity as might be observed with poultry kicking up ground debris. The elevated fresh water reservoir is also more ergonomic to fill for the human operator.

Another object is to provide an animal waterer that may service many animal types both domestic or wild.

Another object is to provide a seamless reservoir to minimize the potential for leaking, to use materials that are non-reactive with minerals that may be present in various water sources, and to use materials that are not susceptible to corrosion or contamination.

Another object is to provide an animal waterer design that my be built using potable water standards suitable for human consumption to minimize animal infections resulting from chemical leaching.

Additional improvements may include an insulating barrier surrounding the water reservoir, optional filtering elements further cleaning the water supply, assemblies to autofill the water reservoir, conical lids to deter fowl from roosting on top of the waterer, or straps holding the reservoir to the stand.

Another object is to provide filling from the top or a hose, and cleaning from the hose.

Another object is to provide a separate electric heater element for the reservoir and the trough and an insulating column for the plumbing therebetween. The preferred stainless steel embodiment allows use of acidic fluids such as apple cider vinegar.

Other aspects of this invention will appear from the following description and appended claims, reference being made to the accompanying drawings forming a part of this specification wherein like reference characters designate corresponding parts in the several views.

An animal watering system is provided comprising a water reservoir and heating system, suspended over a separate drinking water receptacle and heating system. The heating systems may be omitted depending on the desired operating climate. The two heated sections are separated by a guarded plumbing tree providing a means for turning off the water supply from the fresh water reservoir, straining and/or filtering the water supply, draining or filling the water supply, metering the water supply into the drinking receptacle/tray, and centering the guard surrounding the plumbing tree allowing free operation of the water level metering device. The guard also provides a chimney effect keeping the plumbing tree from freezing. The system is modular for ease of shipping, service, and mobility. The preferred material embodiment inhibits algae growth, bacterial growth, and general contamination of the fresh water supply and drinking water supply. As embodied the system can be constructed to be Bisphenol A (BPA) and lead free.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
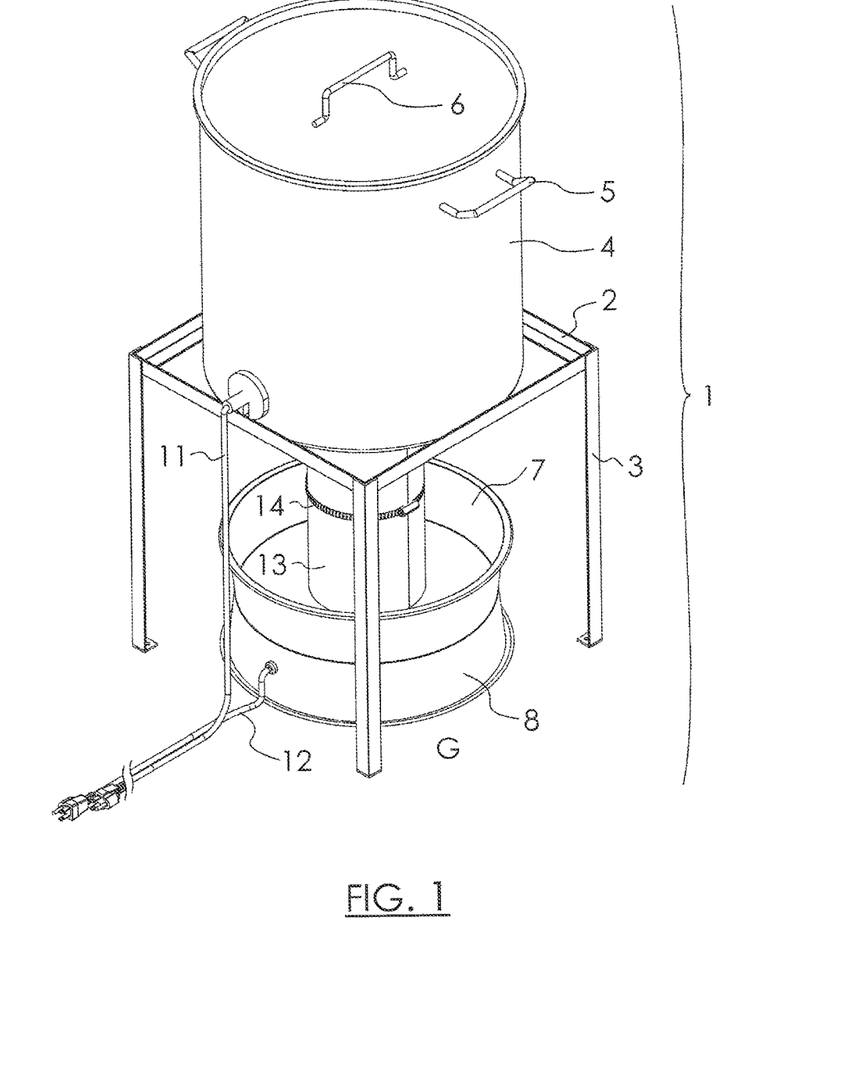
FIG. 1 is a top perspective view of the animal waterer.
Figure 2:
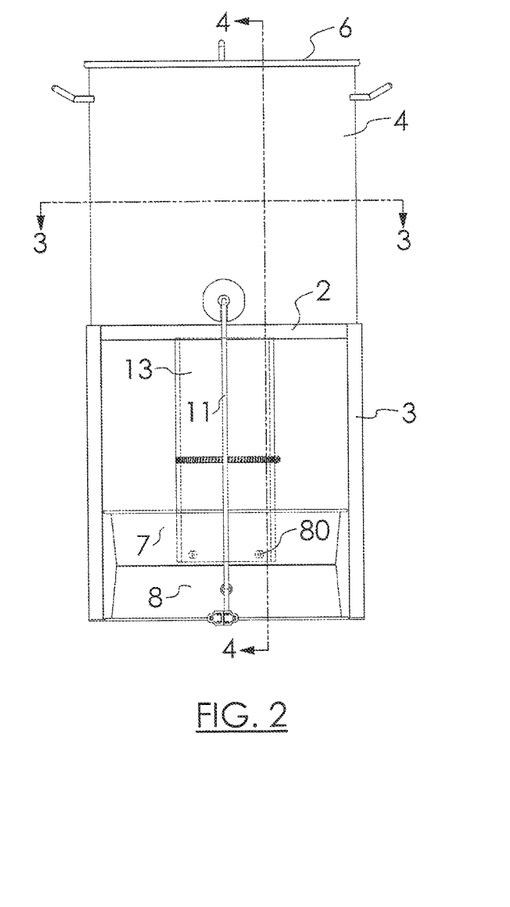
FIG. 2 is a rear elevation view of the animal waterer in FIG. 1.
Figure 3:
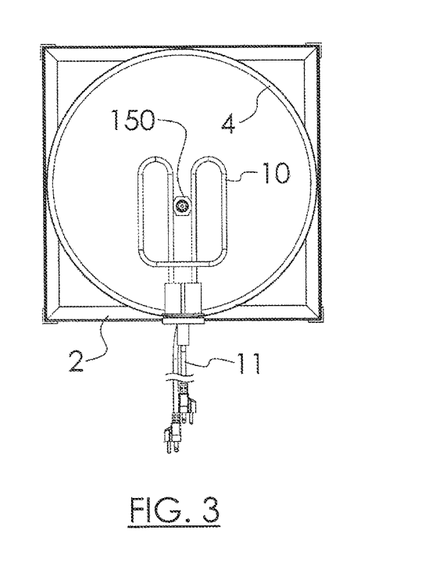
FIG. 3 is a top rear view of the FIG. 1 reservoir without the lid, depicting a reservoir heating system.

Referring first to FIGS. 1, 2, 3 the animal waterer 1 has a (metal) stand 2 with four legs 3. The stand 2 supports the reservoir 4 off the ground G. The reservoir 4 has handle 5 for lofting and a lid 6 for filling with animal drinking water.

A trough 7 is supported off the ground by base 8. The base 8 has a resistance heater 9 shown in FIG. 5. The reservoir 4 has a waterproof resistance heater 10. Heaters 9, 10 are prior art models with built in temperature controllers that cycle on at near freezing temperatures. Power cords 11, 12 supply A/C power to the heaters 10, 9 respectfully. A removable chimney insulator 13 may consist of two plastic halves secured by a hose clamp 14. This chimney insulator 13 keeps the heat from heater 9 traveling up around the plumbing tree 40 shown in FIG. 4. Holes 80 allow water in.

Figure 4:
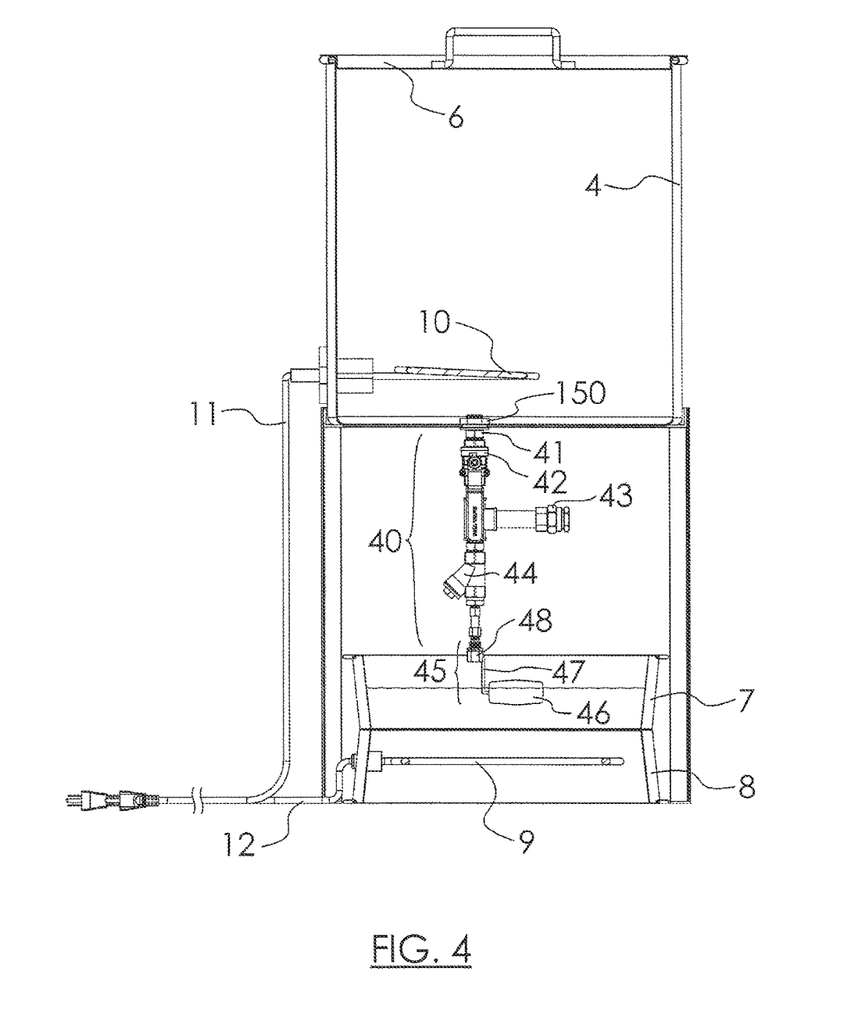
FIG. 4 is a side sectional view of FIG. 1 shown with the plumbing tree guard removed.
Figure 5:
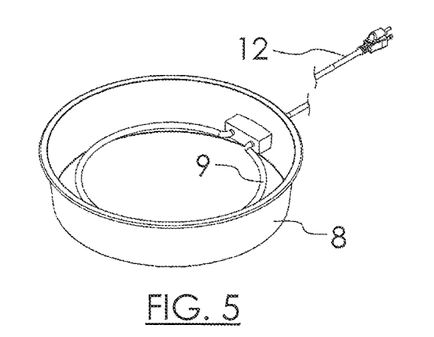
FIG. 5 is a bottom perspective view of the heater base in FIG. 1.

The plumbing tree 40 threads at its top 41 into a bulkhead nut 150 at the bottom of the reservoir. A manual shut off valve 42 has a handle 210 which allows the operator to fill the trough 7 using city water inlet 43 when valve 42 is closed, usually in warm weather. A (metal mesh) filter 44 is easily accessed when the chimney insulator 13 is removed. This filter catches debris such as leaves that may have entered the reservoir 4. It also catches hard water chemical buildup.

A float switch assembly 45 connects under the filter 44. The float 46 is shown in the down position in FIG. 8 in dotted circle which pulls arm 47 angled to vertical which opens the valve 48 to fill the trough from either the reservoir 4 or the city water inlet 43. When the float 46 rises to close valve 48 in a known manner, it is as shown by arrow CLOSED. When valve 48 is open water droplets DR travel down arm 47 as shown in dots in FIG. 8.

Figure 6:
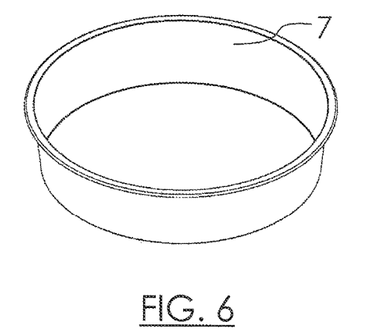
FIG. 6 is a top perspective view of the water pan in FIG. 1.
Figure 7:
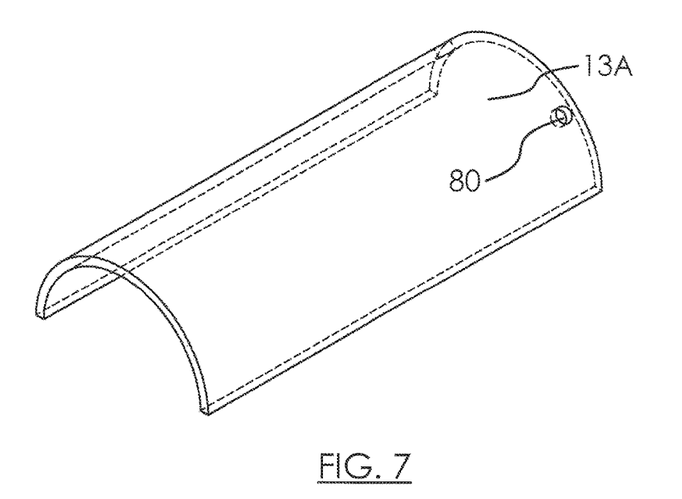
FIG. 7 is a perspective view of the plumbing tree guard half.

FIG. 6 shows a trough 7. FIG. 7 shows one half 13A of the chimney insulator 13. FIGS. 9, 10, 11, 12 show labeled parts.

Figure 8:
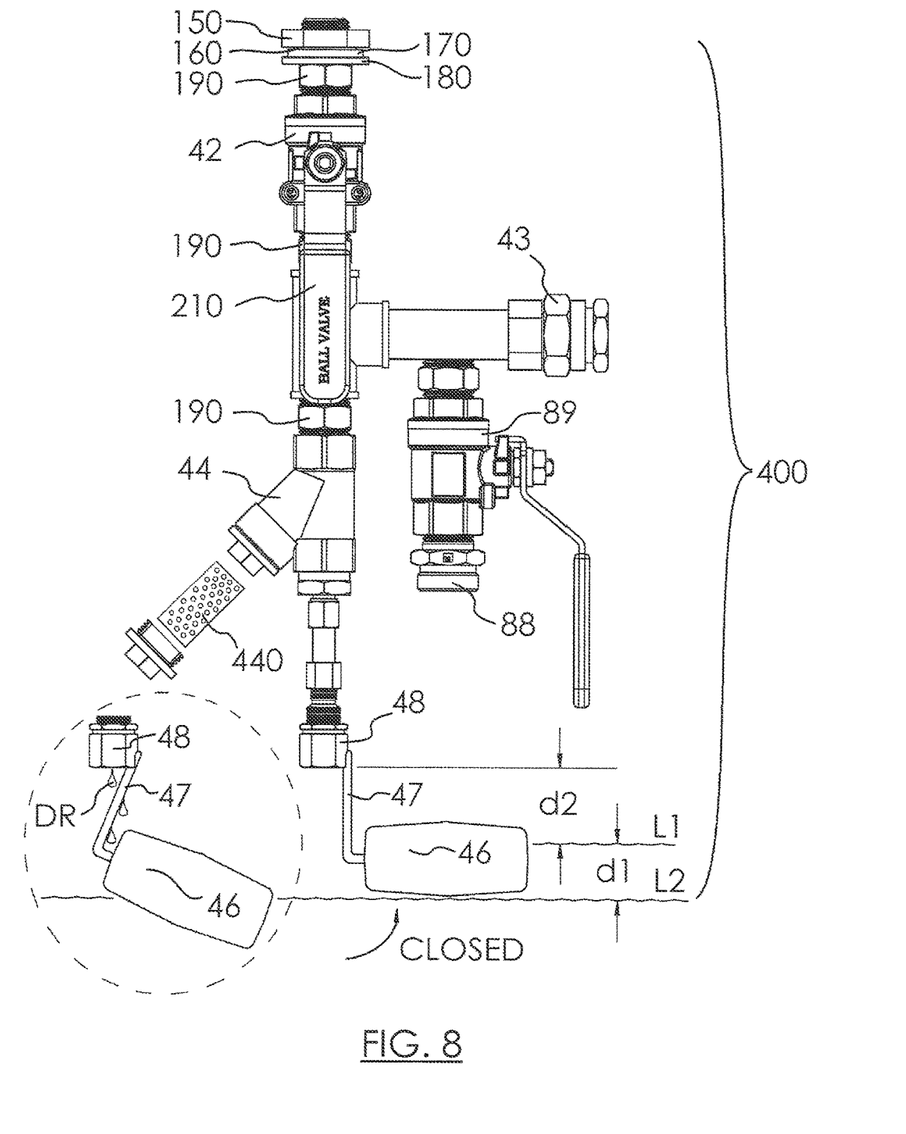
FIG. 8 is a front elevation view of the plumbing tree assembly.
Figure 9:
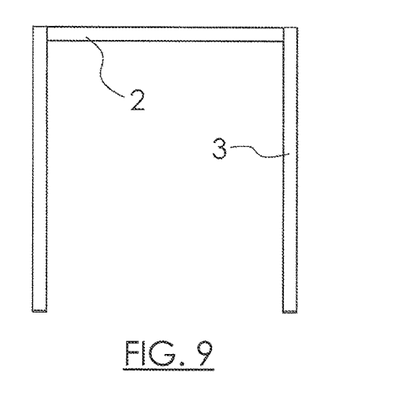
FIG. 9 is a side elevation view of the reservoir stand assembly.
Figure 10:
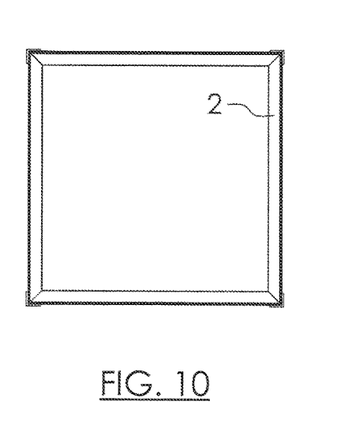
FIG. 10 is a top plan view of the reservoir stand assembly.
Figure 11:
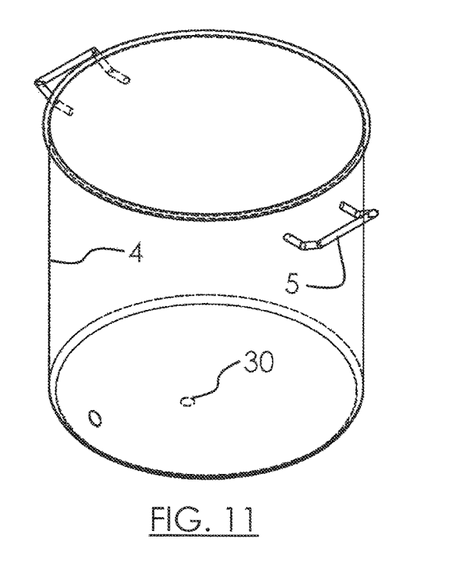
FIG. 11 is a perspective view of the water reservoir.
Figure 12:
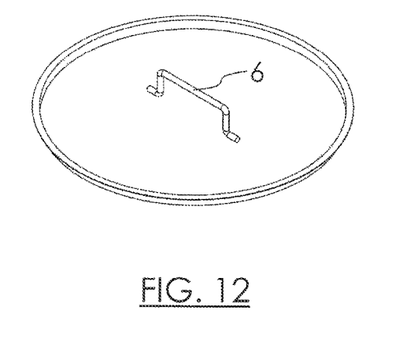
FIG. 12 is a view of the reservoir lid.

Referring next to FIG. 8 bulkhead nut is labeled 150, and O ring 160 are mounted inside the bottom of the reservoir 4. A flat washer 170, a flat bulkhead washer 180, and a male to male nipple 190 are placed at the exterior of and penetrating through reservoir 4. Water flows through an open manual ball valve 42 and out the float valve 48 if the city water inlet is not used. City water inlet 43 is also used to flush the filter strainer 440 and the float valve 48 when manual valve 42 is closed. An optional manual valve 89 can allow optional cleaning outlet 88 to be used to clean up the watering area. This modified assembly is labeled 400.

Nominal distance d1 is 1 ½ inch from level line L1 to level line L2. Distance d2 is about 1 ¼ inch to ensure no trough water travels upward. During filling some droplets DR travel down arm 47. However, it is not possible for contaminated trough water to travel up arm 47 past the float valve 48 during a filling cycle. Not shown is an embodiment with an electric heater directly in the trough, or beneath the trough.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. An animal waterer comprising:
    a stand supporting a reservoir above a ground surface;
    said reservoir having a lid for filling and an exit hole at a bottom for draining;
    said reservoir having an electric heater;
    a plumbing tree connected to the exit hole;
    said plumbing tree having a manual shut off valve above a city water inlet;
    said shut off valve closes the city water inlet;

a replaceable filter connected under the shut off valve and the city water inlet;
a float switch connected under the filter;
a trough located under the float switch; and
wherein when the shut off valve is open and the float switch is open, water flows from the reservoir to the trough, and when the shut off valve is closed, and the city water inlet is pressurized, and the float switch is open, water flows from the city water inlet to the trough.

2. The waterer of claim 1, wherein the trough is supported above the ground surface.

3. The waterer of claim 2, wherein a base having a heater supports the trough.

4. The waterer of claim 3, wherein the base heater is an electric heater.

5. The waterer of claim 1, wherein the trough has an electric heater.

6. The waterer of claim 3, wherein the plumbing tree further comprises an insulating jacket.

7. The waterer of claim 5, wherein the plumbing tree further comprises an insulating jacket.

8. The waterer of claim 1, wherein the float switch further comprises an arm to a float that prohibits water in the trough from travelling up the arm into the float switch during a filling cycle.

9. The waterer of claim 1, wherein the city water inlet further comprises a T outlet for cleaning and a downstream shut off valve.

10. The waterer of claim 1, wherein when the shut off valve is closed, and the city water inlet is pressurized, and the filter is removed, the city water flushes a filter housing.

11. An animal waterer comprising:
a water reservoir having a stand means functioning to support the water reservoir above a ground surface;
said water reservoir having an open top for filling, and having a drain hole at a bottom;
a plumbing tree affixed to the drain hole;
said plumbing tree having a shut off valve above a city water connection and a float switch under the city water connection;
a trough under the float switch; and
wherein when the shut off valve is open and the float switch is open, water flows from the water reservoir to the trough, and when the shut off valve is closed, and the city water connection is pressurized, and the float switch is open, water flows from the city water connection to the trough.

12. he waterer of claim 11, wherein the water reservoir further comprises a heater means functioning to maintain water in the water reservoir above a freezing temperature.

13. The waterer of claim 12, wherein the heater means further comprises a submersible electric heater.

14. The waterer of claim 12, wherein the trough further comprises a heater means functioning to keep water in the trough above a freezing temperature.

15. The waterer of claim 14, wherein the heater means further comprises a base having an electric heater, wherein the base supports the trough above a ground surface.

16. The waterer of claim 15, wherein the plumbing tree further comprises a replaceable filter under the city water connection.

17. The waterer of claim 16, wherein the plumbing tree further comprises a removable insulating jacket.

18. An animal waterer comprising:
an above ground water reservoir having an exit port at a bottom thereof;
a plumbing tree connected to the exit port and an outlet over a trough;
said plumbing tree having a shut off valve above a city water inlet, a filter, and having a float switch at the outlet; and
wherein the trough can be filled with city water with the shut off valve is closed, and filled with the reservoir with the shut off valve open.

19. The waterer of claim 18, wherein the reservoir further comprises a heater.

20. The waterer of claim 19, wherein the trough further comprises a non-submersible heater, and the plumbing tree further comprises a removable insulating jacket.

* * * * *